US012791357B2

(12) United States Patent
Huang

(10) Patent No.: US 12,791,357 B2
(45) Date of Patent: Nov. 10, 2026

(54) HOUSING FOR ENERGY METER

(71) Applicant: Chicony Power Technology Co., Ltd., New Taipei City (TW)

(72) Inventor: Chih-Yang Huang, New Taipei City (TW)

(73) Assignee: Chicony Power Technology Co., Ltd., New Taipei City (TW)

( * ) Notice: Subject to any disclaimer, the term of this patent is extended or adjusted under 35 U.S.C. 154(b) by 395 days.

(21) Appl. No.: 18/664,325

(22) Filed: May 15, 2024

(65) Prior Publication Data

US 2025/0277677 A1 Sep. 4, 2025

(30) Foreign Application Priority Data

Mar. 1, 2024 (TW) ................................ 113107624

(51) Int. Cl.
*G01D 4/02* (2006.01)

(52) U.S. Cl.
CPC ...................................... *G01D 4/02* (2013.01)

(58) Field of Classification Search
CPC .......... G01D 4/02; H02B 1/0523; H02B 1/03; G01R 1/04; G01R 11/04; G01R 22/065; G01R 11/02
See application file for complete search history.

(56) References Cited

U.S. PATENT DOCUMENTS

| | | | | |
|---|---|---|---|---|
| 2008/0284614 | A1 | 11/2008 | Perez et al. | |
| 2016/0033561 | A1* | 2/2016 | Sykes | G01D 4/002 702/62 |
| 2020/0153216 | A1* | 5/2020 | Ediger | H02G 3/126 |

FOREIGN PATENT DOCUMENTS

| | | | |
|---|---|---|---|
| CN | 203378158 | U | 1/2014 |
| CN | 207051365 | U | 2/2018 |
| CN | 211905467 | U | 11/2020 |
| CN | 212301624 | U | 1/2021 |
| CN | 213181680 | U | 5/2021 |
| CN | 218003518 | U | 12/2022 |
| TW | 201023721 | A | 6/2010 |
| TW | 201643013 | A | 12/2016 |
| WO | 2012095652 | A1 | 7/2012 |

* cited by examiner

*Primary Examiner* — Xin Y Zhong
(74) *Attorney, Agent, or Firm* — CKC & Partners Co., LLC

(57) ABSTRACT

A housing for an energy meter includes a body, a cover, a chute structure, and a slider. The body has a first surface and a vertical wall substantially perpendicular to the first surface. The cover has a side wall. The chute structure includes a chute and a peripheral wall surrounding the chute. The peripheral wall is provided with a limiting element. The chute structure is disposed on one of the vertical wall and the side wall, and the slider is disposed on the other one of the vertical wall and the side wall. The slider is slidably disposed in the chute. The limiting element is configured to limit a position of the slider. The cover is slidably disposed on the body through the slider and the chute structure.

13 Claims, 12 Drawing Sheets

22

70

HOUSING FOR ENERGY METER

CROSS-REFERENCE TO RELATED APPLICATIONS

The present application claims priority to Taiwan Patent Application No. 113107624, filed on Mar. 1, 2024, the disclosure of which is incorporated herein by reference in its entirety.

FIELD OF INVENTION

The present disclosure relates to a housing for an energy meter.

BACKGROUND

In recent years, a trend of energy conservation and carbon reduction has gradually increased application of smart power meters. However, wiring and installation of current smart power meters are inconvenient, and the current smart power meters are not expandable.

SUMMARY

In order to solve the above technical problem, the present disclosure provides a housing for an energy meter, which includes a body, a cover, a chute structure, and a slider. The body has a first surface and a vertical wall substantially perpendicular to the first surface. The cover has a side wall. The chute structure includes a chute and a peripheral wall surrounding the chute. The peripheral wall is provided with a first limiting element. The chute structure is disposed on one of the vertical wall and the side wall, and the slider is disposed on the other one of the vertical wall and the side wall. The slider is slidably disposed in the chute. The first limiting element is configured to limit a position of the slider. The cover is slidably disposed on the body through the slider and the chute structure.

In an embodiment of the present disclosure, the first limiting element is close to an end of the chute. When the slider is limited between the first limiting element and the end of the chute, a front edge of the cover is in front of a front edge of the body, or a rear edge of the cover is behind a rear edge of the body.

In an embodiment of the present disclosure, the peripheral wall of the chute structure is further provided with a second limiting element and a third limiting element. When the slider is limited between the second limiting element and the third limiting element, a front edge of the cover is substantially aligned with a front edge of the body, or a rear edge of the cover is substantially aligned with a rear edge of the body.

In an embodiment of the present disclosure, the peripheral wall is further provided with a notch, and the notch communicates with the chute and is configured to allow the slider to pass.

In an embodiment of the present disclosure, the notch has a first opening at an outer surface of the peripheral wall and a second opening at an inner surface of the peripheral wall, and a width of the first opening is greater than a width of the second opening.

In an embodiment of the present disclosure, the body further comprises a second surface, and the second surface is provided with a holding structure. The holding structure comprises a first protrusion and a second protrusion. The first protrusion is disposed on the second surface. The second protrusion extends from the second surface and forms a space with the second surface. The space is configured to receive a first edge of a bracket. The first protrusion is configured to abut against the first edge such that the second protrusion interferes with the first edge.

In an embodiment of the present disclosure, the second protrusion has a first inclined surface, and the first inclined surface faces the second surface and is configured to interfere with the first edge of the bracket.

In an embodiment of the present disclosure, a projection of the second protrusion on the second surface does not overlap with a projection of the first protrusion on the second surface.

In an embodiment of the present disclosure, the housing further includes a holding element, a guide rail, and a guide groove. The guide rail is disposed on one of the holding element and the second surface, and the guide groove is disposed on the other one of the holding element and the second surface. The guide rail is slidably disposed in the guide groove, so that the holding element is slidably disposed on the second surface. The holding element is configured to hold a second edge of the bracket.

In an embodiment of the present disclosure, a front end of the holding element has a second inclined surface, and the second inclined surface faces the second surface and is configured to interfere with the second edge of the bracket.

In an embodiment of the present disclosure, the second surface is further provided with a first engaging element. The holding element has an elastic arm. The elastic arm is provided with a second engaging element. The second engaging element is configured to engage with the first engaging element to fix a position of the holding element on the second surface.

In an embodiment of the present disclosure, the body further comprises a third surface. The third surface is provided with a boss, and an outer wall of the boss is provided with a first latching element.

In an embodiment of the present disclosure, the body further comprises a fourth surface. The fourth surface is provided with a recess that matches the boss, and an inner wall of the recess is provided with a second latching element that matches the first latching element.

In sum, a housing of an energy meter of the present disclosure includes a body and a cover slidably disposed on the body. The cover can slide upward or downward relative to the body to expose a terminal block and/or a connector disposed on the body, thereby facilitating a user to connect external devices to the energy meter through wires. Furthermore, the cover is slidably disposed on the body through one or more sliders and one or more chute structures. Each of the chute structures includes a chute and a peripheral wall surrounding the chute. The peripheral wall is provided with one or more limiting elements configured to limit positions of the sliders in the chute, so that the sliders can stay at specific positions. Moreover, a back surface of the body may be provided with a holding structure and a slidable holding element to facilitate the user to mount the energy meter on a bracket. In addition, a side surface of the body may be provided with a boss or a recess. Through a combination of the boss and the recess, multiple energy meters can be combined into an energy meter assembly.

BRIEF DESCRIPTION OF DRA WINGS

DETAILED DESCRIPTION

Figure 1:
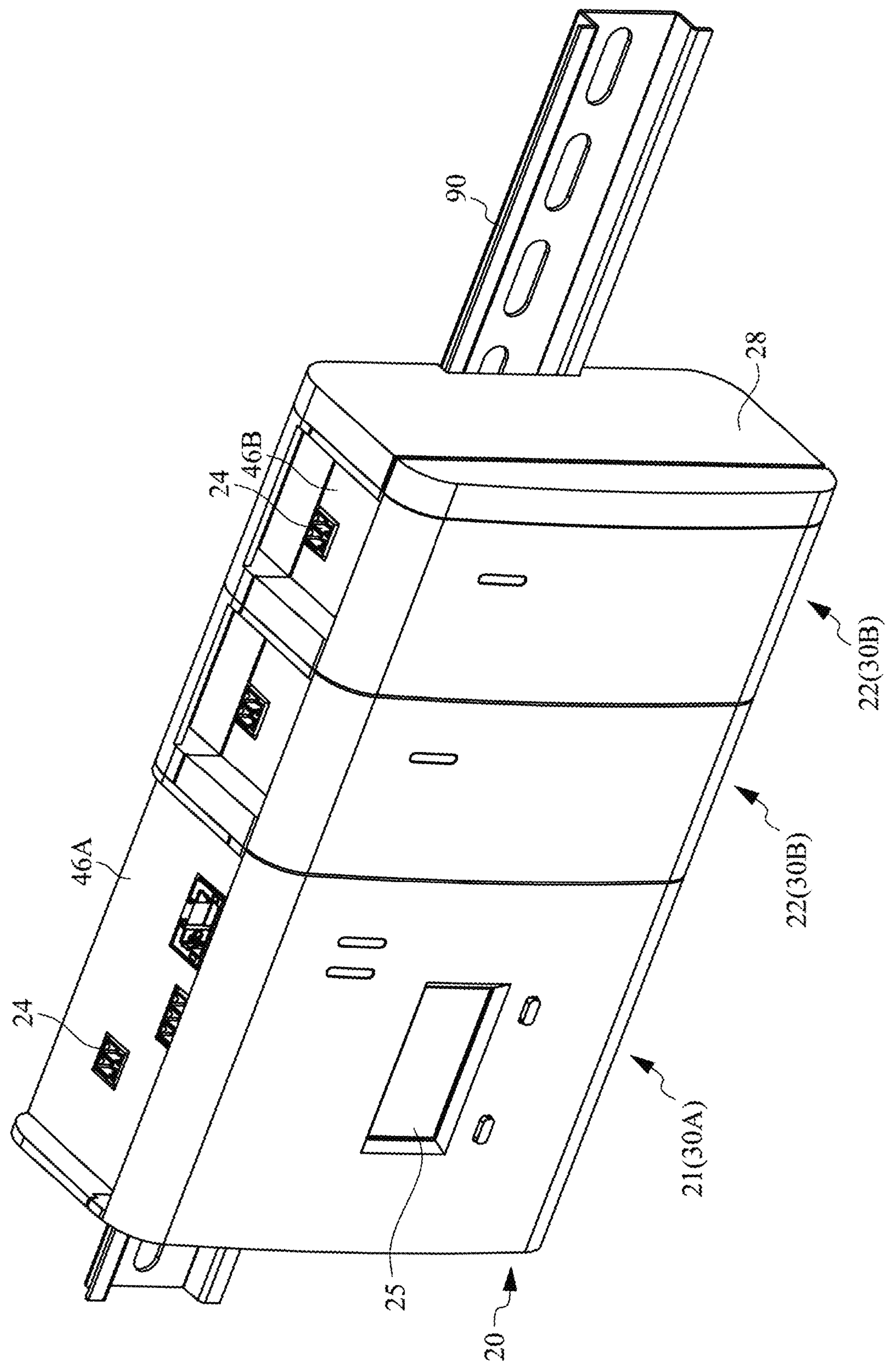
FIG. 1 is a schematic diagram showing an energy meter assembly installed on a bracket according to a first embodiment of the present disclosure.

In order to make the description of the present disclosure more detailed and complete, reference may be made to the accompanying drawings and various embodiments described below. Elements in the drawings are not drawn to scale and are provided solely to illustrate the present disclosure. Many practical details are described below to provide a comprehensive understanding of the present disclosure. However, one of ordinary skill in the relevant art will understand that the present disclosure may be practiced without one or more of the practical details. Accordingly, these details should not be used to limit the present disclosure.

Please refer to FIG. 1, which is a schematic diagram showing an energy meter assembly 20 installed on a bracket 90 according to a first embodiment of the present disclosure. The energy meter assembly 20 includes a first energy meter 21 and one or more second energy meters 22. One of the second energy meters 22 is detachably connected to the first energy meter 21, and any two adjacent second energy meters 22 are detachably connected to each other. The first energy meter 21 and the one or more second energy meters 22 are configured to acquire energy usage information from various devices. The energy usage information includes one or more of gasoline usage information, electricity usage information, water usage information, and gas usage information.

Please refer to FIG. 1, the first energy meter 21 is a master energy meter, and the one or more second energy meters 22 are slave energy meters. Taking the energy meter assembly 20 including one first energy meter 21 and one second energy meter 22 as an example, the first energy meter 21 may be configured to: acquire first energy usage information from a device, acquire second energy usage information from the second energy meter 22, count and analyze the first and second energy usage information, calculate carbon emission based on the first and second energy usage information, transmit the first and second energy usage information to an electronic device (for example, transmit the first and second energy usage information to a users' mobile device through Bluetooth communication, or transmit the first and second energy usage information to a server through network), and display the first and second energy usage information on a display 25 of the first energy meter 21. The second energy meter 22 may be configured to: acquire the second energy usage information from another device, and transmit the second energy usage information to the first energy meter 21.

Figure 2:
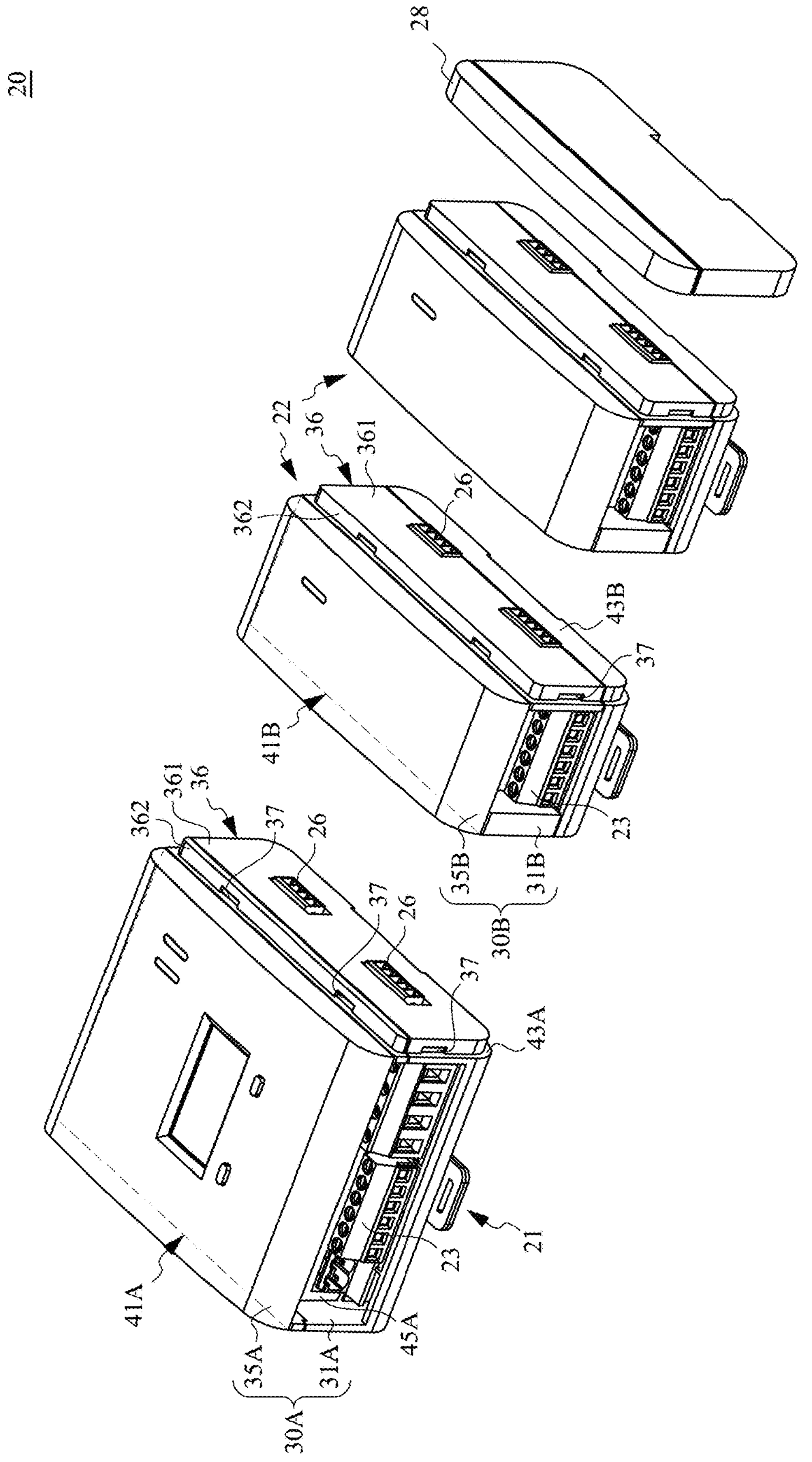
FIG. 2 is an exploded view of the energy meter assembly in FIG. 1.

Please refer to FIG. 2, which is an exploded view of the energy meter assembly 20 in FIG. 1. The first energy meter 21 includes a first housing 30A. The first housing 30A includes a first body 31A and a first cover 35A. The first cover 35A is disposed on the first body 31A, and covers a first surface 41A (shown in dotted lines) of the first body 31A. The second energy meter 22 includes a second housing 30B. The second housing 30B includes a second body 31B and a second cover 35B. The second cover 35B is disposed on the second body 31B, and covers a first surface 41B (shown in dotted lines) of the second body 31B. The first housing 30A and the second housing 30B may be made of insulating materials, such as plastic, but are not limited thereto.

Please refer to FIG. 2, a third surface 43A of the first body 31A of the first energy meter 21 is provided with a boss 36. The boss 36 has a top surface 361 and an outer wall 362 surrounding the top surface 361. An outer surface of the outer wall 362 is provided with one or more first latching elements 37. Please refer to FIG. 3, which is a schematic diagram of the second energy meter 22 in FIG. 2 viewed from another angle. A fourth surface 44B of the second body 31B of the second energy meter 22 is provided with a recess 38. The recess 38 has a bottom surface 381 and an inner wall 382 surrounding the bottom surface 381. An inner surface of the inner wall 382 is provided with one or more second latching elements 39. The recess 38 corresponds to and matches the boss 36. That is, the recess 38 has a complementary shape to the boss 36. The second latching elements 39 correspond to and match the first latching elements 37. That is, the second latching elements 39 have a complementary shape to the first latching elements 37.

Please refer to FIG. 2, the first energy meter 21 may further include one or more first connectors 26 embedded in the top surface 361 of the boss 36. Please refer to FIG. 3, the second energy meter 22 may further include one or more second connectors 27 embedded in the bottom surface 381 of the recess 38. By combining the boss 36 with the recess 38, and engaging the second latching elements 39 with the first latching elements 37, the second energy meter 22 is detachably connected to the first energy meter 21. At this time, the second connectors 27 are connected to the first connectors 26. When the first and second connectors 26 and 27 are connected, the first energy meter 21 can communicate with the second energy meter 22 and supply power to the second energy meter 22, and the second energy meter 22 can transmit the second energy usage information to the first energy meter 21.

Figure 3:
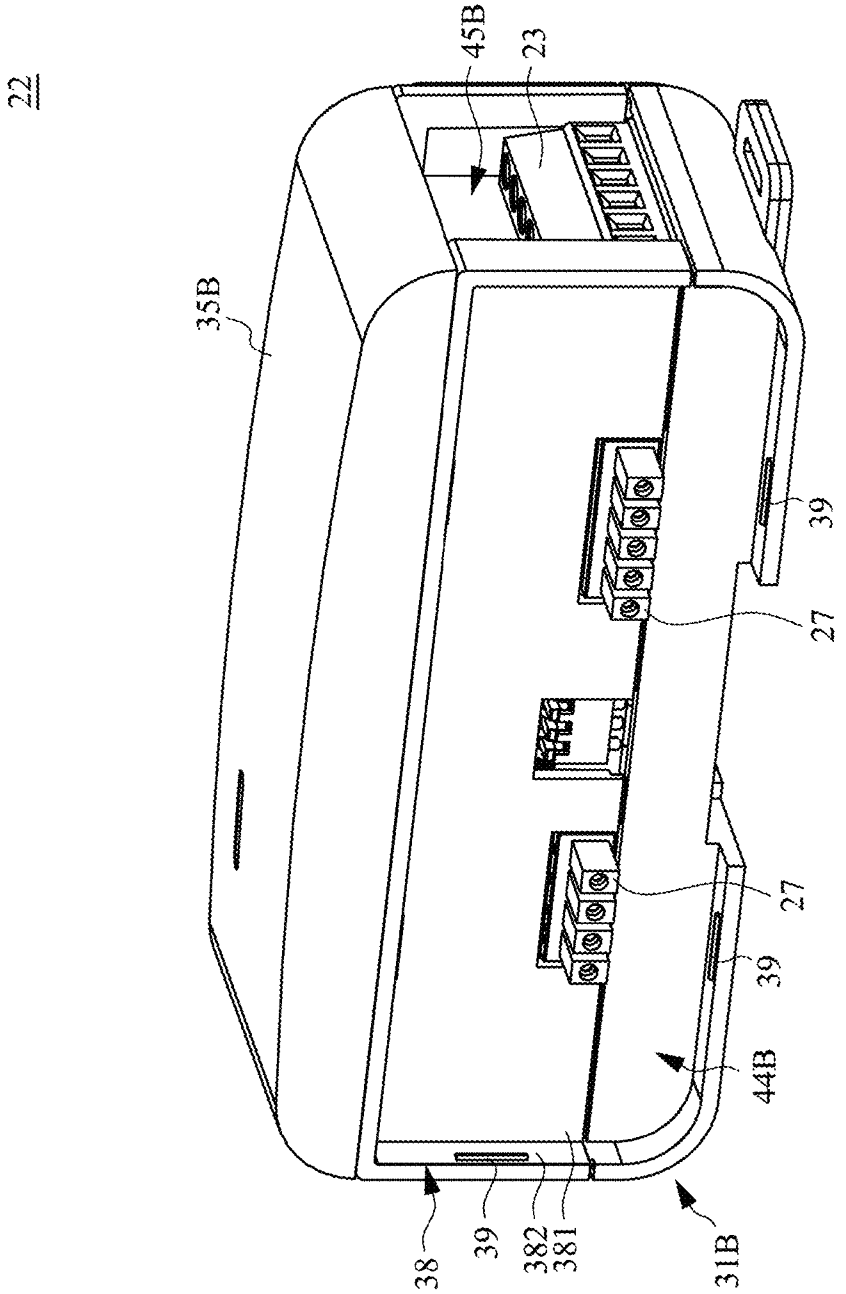
FIG. 3 is a schematic diagram of a second energy meter in FIG. 2 viewed from another angle.

As shown in FIG. 2 and FIG. 3, in this embodiment, the first latching elements 37 are engaging slots, and the second latching elements 39 are engaging blocks. In other embodiments, the first latching elements 37 may be engaging blocks, and the second latching elements 39 may be engaging slots. In this embodiment, a plurality of first latching elements 37 are spaced around the boss 36, and a plurality of second latching elements 39 are spaced around the recess 38. In other embodiments, one or more sides of the boss 36 may be provided with one or more first latching elements 37, and one or more sides of the recess 38 may be provided with one or more second latching elements 39.

As shown in FIG. 2, a third surface 43B of the second body 31B of the second energy meter 22 is also provided with the boss 36, the first latching elements 37, and the first connectors 26, so as to facilitate series connection of two or more second energy meters 22. The third surface 43B and the fourth surface 44B are two opposite surfaces of the second body 31B. Specifically, by combining the boss 36 of one second energy meter 22 with the recess 38 of another second energy meter 22, and engaging the second latching elements 39 in the recess 38 with the first latching elements 37 on the boss 36, the aforementioned two second energy meters 22 are detachably connected.

In other embodiments, the third surface 43A of the first body 31A of the first energy meter 21 may be provided with the recess 38 and the one or more second latching elements 39 in the recess 38, the fourth surface 44B of the second body 31B of each second energy meter 22 may be provided with the boss 36 and the one or more first latching elements 37 on the boss 36, and the third surface 43B of the second body 31B may be provided with the recess 38 and the one or more second latching elements 39 in the recess 38.

Please refer to FIG. 1 and FIG. 2, in an embodiment, the energy meter assembly 20 further includes an end cover 28. The end cover 28 is provided with a recess (not shown) that corresponds to and matches the boss 36. By combining the recess of the end cover 28 with the boss 36 of the first energy meter 21 or the boss 36 of the second energy meter 22, the end cover 28 covers the third surface 43A of the first energy meter 21 or the third surface 43B of the second energy meter 22 that is farthest from the first energy meter 21, thereby covering the unused first connectors 26. The recess of the end cover 28 may also be provided with the one or more second latching elements (not shown) configured to engage the first latching elements 37 on the boss 36.

Figure 4:
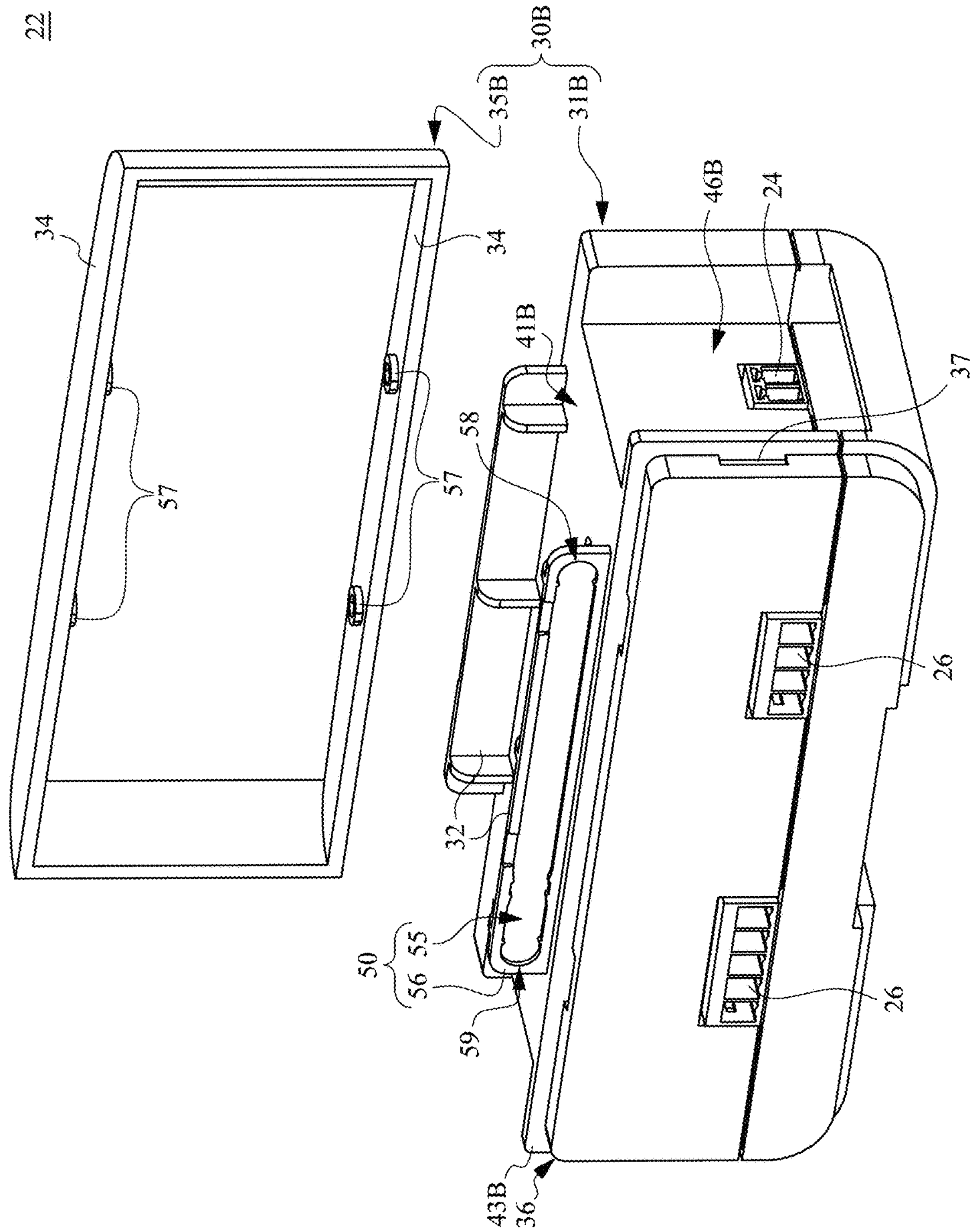
FIG. 4 is an exploded view of the second energy meter in FIG. 3.

Please refer to FIG. 4, which is an exploded view of the second energy meter 22 in FIG. 3. The second body 31B of the second energy meter 22 further includes one or more vertical walls 32. Each of the vertical walls 32 is provided with a chute structure 50. In this embodiment, the second body 31B includes two vertical walls 32, and the two vertical walls 32 are located on two opposite sides of the first surface 41B and are substantially perpendicular to the first surface 41B. Specifically, the two vertical walls 32 are respectively close to the third surface 43B and the fourth surface 44B of the second body 31B. Each of the chute structures 50 is disposed on a surface of the corresponding vertical wall 32 away from the other vertical wall 32. Each of the chute structures 50 includes a chute 55 and a peripheral wall 56 surrounding the chute 55.

As shown in FIG. 4, the second cover 35B of the second energy meter 22 has one or more side walls 34. An inner surface of each of the side walls 34 is provided with one or more sliders 57. In this embodiment, the sliders 57 are disposed on the two side walls 34 on two opposite sides of the second cover 35B, that is, they are disposed on the two side walls 34 corresponding to the two chute structures 50. Each of the side walls 34 is provided with two sliders 57, but is not limited thereto. The sliders 57 correspond to the chutes 55 of the chute structures 50 and are slidably disposed in the chutes 55. The second cover 35B is slidably disposed on the second body 31B through the sliders 57 and the chute structures 50. In this embodiment, the sliders 57 are shaped as circles, but are not limited thereto. The sliders 57 may be shaped as ellipses, polygons, or irregular shapes, as long as the sliders 57 can be slidably disposed in the chutes 55.

As shown in FIG. 4, each of the chutes 55 has a first end 58 and a second end 59 opposite to each other, and the sliders 57 are configured to slide between the first end 58 and the second end 59 of the chute 55. Please refer to FIG. 5, an inner surface of the peripheral wall 56 of each of the chute structures 50 may be provided with one or more limiting elements 51. The limiting elements 51 are configured to limit positions of the sliders 57. Specifically, the limiting elements 51 are configured to block the sliders 57 from sliding in the chute 55, so that the sliders 57 stay at specific positions in the chute 55. A certain external force needs to be applied to deform the sliders 57 or the limiting elements 51 in order for the sliders 57 to pass through the limiting elements 51 and continue to slide.

Figure 5:
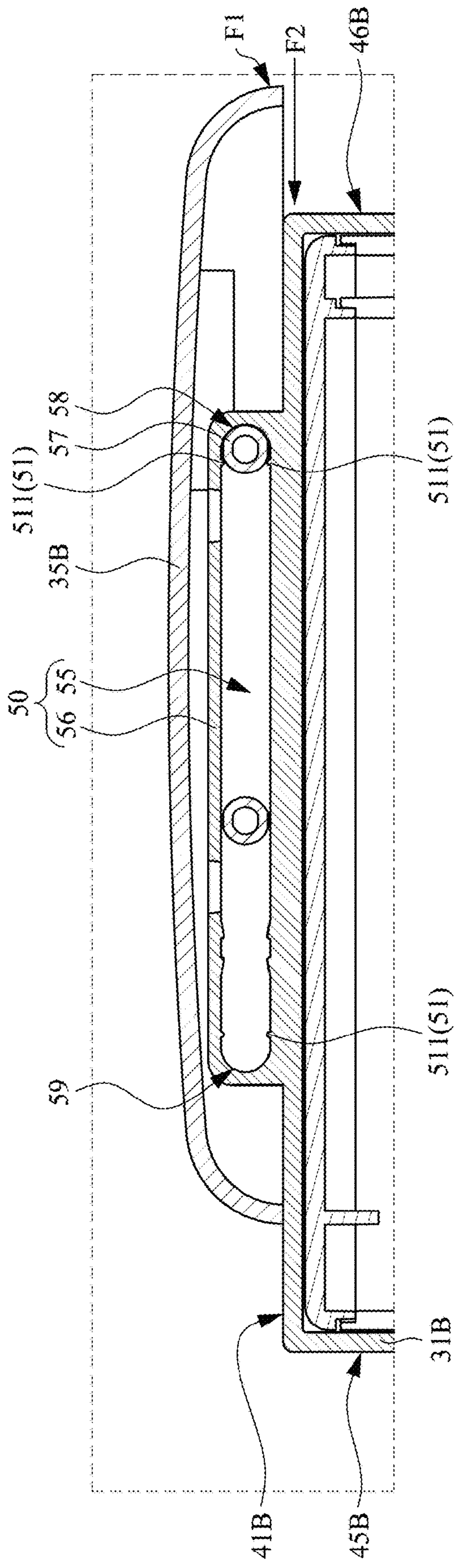
FIG. 5 to FIG. 7 are partial cross-sectional views of the second energy meter in FIG. 3, with a cover in different positions.

Please refer to FIG. 5, the limiting elements 51 may include one or more first limiting elements 511, which are close to the first end 58 and/or the second end 59 of the chute 55. In this embodiment, the first limiting elements 511 are hemispherical protrusions, but are not limited thereto. The first limiting elements 511 may be protrusions with other shapes, as long as the first limiting elements 511 can limit the positions of the sliders 57.

Please refer to FIG. 5, in this embodiment, the peripheral wall 56 is provided with two first limiting elements 511 aligned up and down near the first end 58 of the chute 55. In other embodiments, the peripheral wall 56 may be provided with only one first limiting element 511, which is located at an upper edge or a lower edge of the peripheral wall 56 near the first end 58. When the slider 57 is limited between the first limiting element 511 and the first end 58 of the chute 55, a front edge F1 of the second cover 35B is in front of a front edge F2 of the second body 31B, and the second cover 35B cannot slide.

Please refer to FIG. 3, the second body 31B of the second energy meter 22 has a fifth surface 45B. The second energy meter 22 further includes a terminal block 23. The terminal block 23 is located between the second body 31B and the second cover 35B and close to the fifth surface 45B. The terminal block 23 is configured to connect one or more current transformers and/or flow meters. When the second cover 35B slides to the position shown in FIG. 5, the second cover 35B does not cover the terminal block 23. That is, the terminal block 23 is exposed, so as to facilitate the user to connect the current transformers and/or the flow meters to the terminal block 23 through wires.

Figure 6:
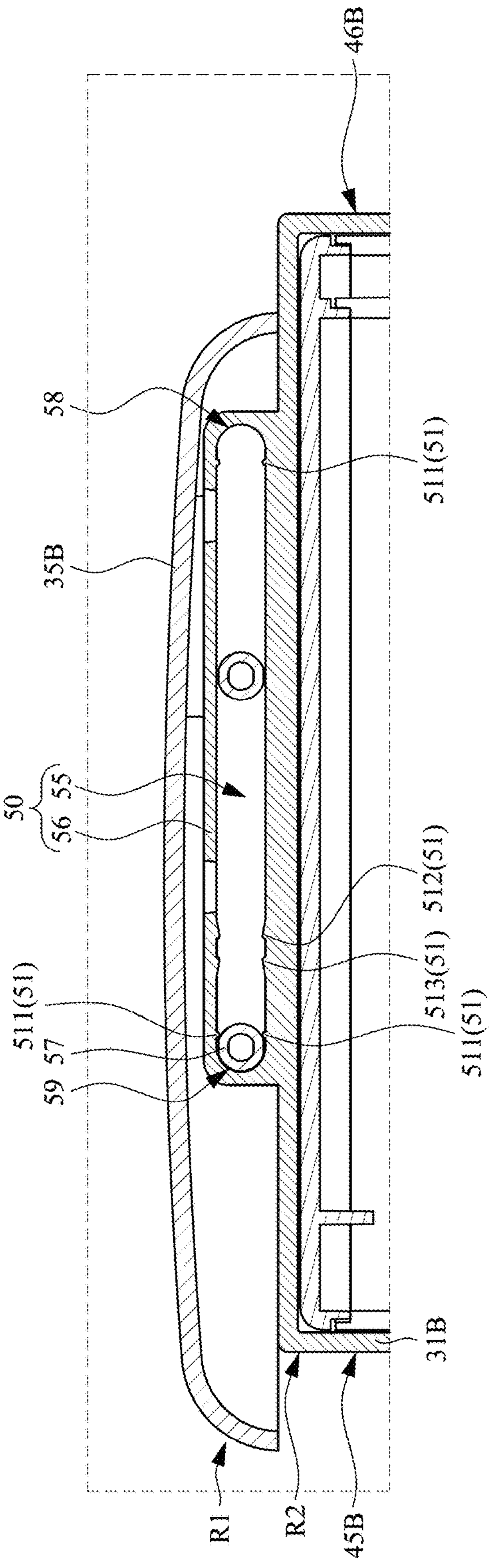

Please refer to FIG. 6, in this embodiment, the peripheral wall 56 is provided with two first limiting elements 511 aligned up and down near the second end 59 of the chute 55. In other embodiments, the peripheral wall 56 may be provided with only one first limiting element 511, which is located at the upper edge or the lower edge of the peripheral wall 56 near the second end 59. When the slider 57 is limited between the first limiting element 511 and the second end 59 of the chute 55, a rear edge R1 of the second cover 35B is behind a rear edge R2 of the second body 31B, and the second cover 35B cannot slide.

Please refer to FIG. 4, the second body 31B of the second energy meter 22 has a sixth surface 46B. The sixth surface 46B and the fifth surface 45B are two opposite surfaces of the second body 31B. The second energy meter 22 further includes a third connector 24. The third connector 24 is disposed between the second body 31B and the second cover 35B, is embedded in the sixth surface 46B, and is configured to connect network equipment or other communication equipment. When the second cover 35B slides to the position shown in FIG. 6, the second cover 35B does not cover the third connector 24. That is, the third connector 24 is exposed, so as to facilitate the user to connect the network equipment or other communication equipment to the third connector 24 through wires.

Figure 7:
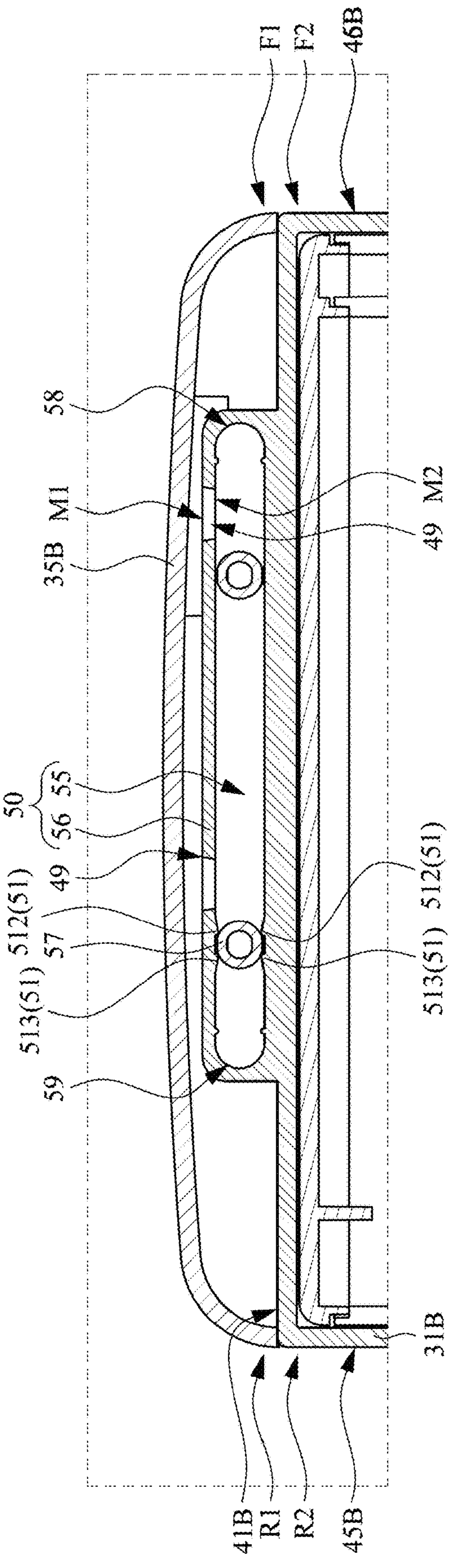

Please refer to FIG. 7, the limiting elements 51 may further include one or more second limiting elements 512 and one or more third limiting elements 513. In this embodiment, the peripheral wall 56 is provided with two second limiting elements 512 aligned up and down and two third limiting elements 513 aligned up and down. In other embodiments, the peripheral wall 56 may be provided with one second limiting element 512 located at the upper edge or the lower edge of the peripheral wall 56, and one third limiting element 513 located at the upper edge or the lower edge of the peripheral wall 56. When the slider 57 is limited between the second limiting element 512 and the third limiting element 513, the front edge F1 of the second cover 35B is substantially aligned with the front edge F2 of the second body 31B, and/or the rear edge R1 of the second cover 35B is substantially aligned with the rear edge R2 of the second body 31B, so that the second cover 35B covers the terminal block 23 and/or the third connector 24, and the second cover 35B cannot slide.

Please refer to FIG. 7, the peripheral walls 56 may be provided with one or more notches 49 communicating with the chute 55. The notches 49 are configured to allow the sliders 57 to pass. Specifically, the sliders 57 are installed into the chute 55 through the notches 49. The number of notches 49 is the same as the number of sliders 57, and positions of the notches 49 correspond to the positions of the sliders 57.

Please refer to FIG. 7, the notches 49 are provided on an edge of the peripheral wall 56 away from the second body 31B. Each of the notches 49 has a first opening M1 at an outer surface of the peripheral wall 56 and a second opening M2 at an inner surface of the peripheral wall 56. A width of the first opening M1 is greater than a width of the second opening M2. That is, each of the notches 49 tapers in a direction from the peripheral wall 56 to the chute 55. In other words, an inner surface of the notch 49 is an inclined surface for guiding the slider 57 to enter the chute 55 through the notch 49.

Please refer to FIG. 7, in an embodiment, the width of the second opening M2 of the notch 49 is slightly less than a maximum width of the slider 57. After the slider 57 enters the chute 55, a certain external force needs to be applied to deform the slider 57 slightly so that the slider 57 can pass through the second opening M2 and leave the chute 55 through the first opening M1.

Figure 8:
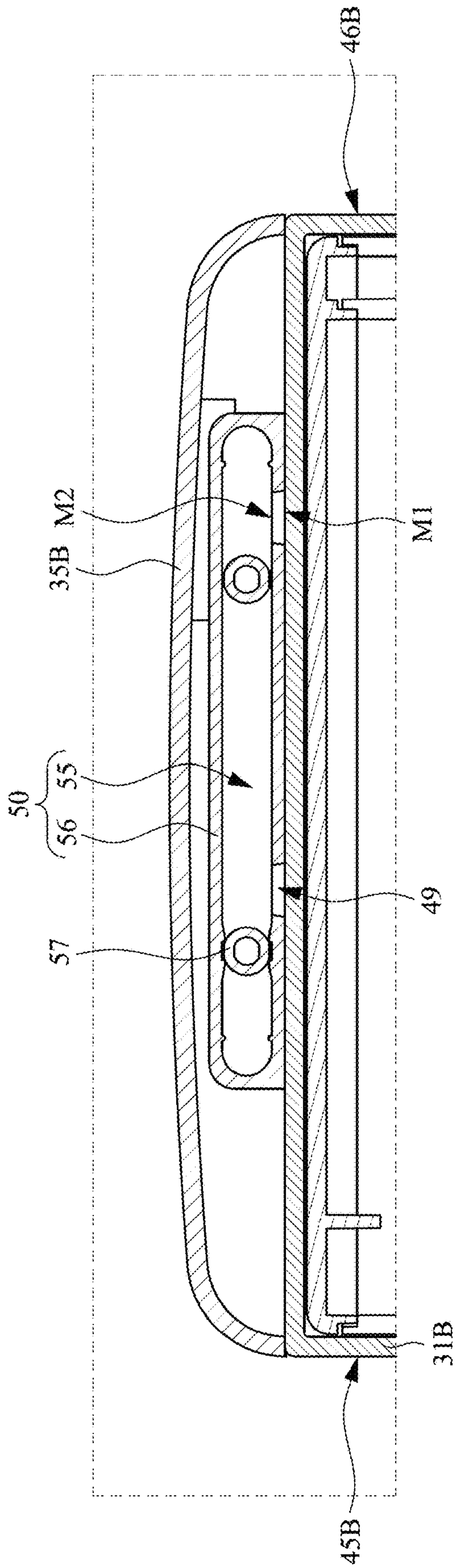
FIG. 8 is a partial cross-sectional view of the second energy meter according to a second embodiment of the present disclosure.

Please refer to FIG. 8, which is a partial cross-sectional view of the second energy meter 22 according to a second embodiment of the present disclosure. The second embodiment differs from the first embodiment in that: the one or more sliders 57 are provided on the one or more vertical walls 32 of the second body 31B, the one or more chute structures 50 are provided on the one or more side walls 34 of the second cover 35B, and the one or more notches 49 are provided on an edge of the peripheral wall 56 close to the second body 31B. In this embodiment, two chute structures 50 are respectively provided on the inner surfaces of the two side walls 34 on two opposite sides of the second cover 35B, and the two vertical walls 32 on two opposite sides of the second body 31B are provided with the one or more sliders 57 corresponding to the two chute structures 50, but are not limited thereto. Moreover, in an embodiment, each of the notches 49 may have a first opening M1 at the outer surface of the peripheral wall 56 and a second opening M2 at the inner surface of the peripheral wall 56. A width of the first opening M1 is greater than a width of the second opening M2, so that an inner surface of the notch 49 is an inclined surface for guiding the slider 57 to enter the chute 55 through the notch 49. In addition, in an embodiment, the width of the second opening M2 of the notch 49 may be slightly less than the maximum width of the slider 57. After the slider 57 enters the chute 55, a certain external force needs to be applied to deform the slider 57 slightly so that the slider 57 can pass through the second opening M2 and leave the chute 55 through the first opening M1. Other details of the chute structures 50 (including the limiting elements 51) and the sliders 57 in the second embodiment are as described in the first embodiment, and will not be described again here.

Figure 9:
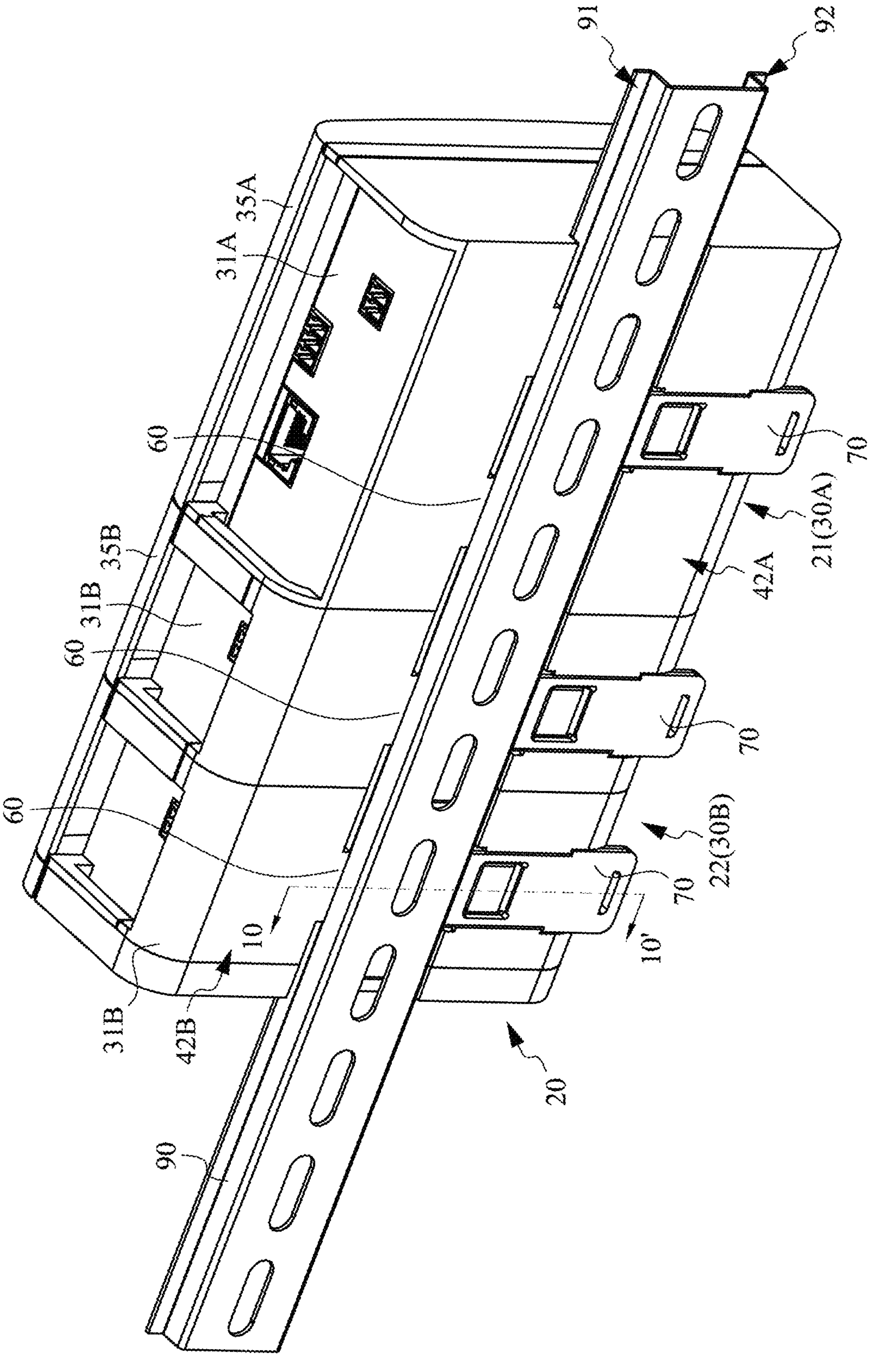
FIG. 9 is a schematic diagram of the energy meter assembly and the bracket in FIG. 1 viewed from another angle.

Please refer to FIG. 9, which is a schematic diagram of the energy meter assembly 20 and the bracket 90 in FIG. 1 viewed from another angle. A second surface 42B of the second body 31B of the second energy meter 22 is provided with a holding structure 60. The second surface 42B and the first surface 41B are two opposite surfaces of the second body 31B. The holding structure 60 is configured to hold a first edge 91 of the bracket 90. In an embodiment, the bracket 90 is a DIN rail, but is not limited thereto. Please refer to FIG. 10, which is a cross-sectional view of the energy meter assembly 20 and the bracket 90 in FIG. 9 taken at a line 10-10'. The holding structure 60 includes a first protrusion 61 and a second protrusion 62. The first protrusion 61 is disposed on the second surface 42B. The second protrusion 62 extends from the second surface 42B and forms a space 65 with the second surface 42B. The space 65 is configured to receive the first edge 91 of the bracket 90. The first protrusion 61 is configured to abut against the first edge 91 of the bracket 90 such that the second protrusion 62 interferes with the first edge 91 of the bracket 90, so as to clamp the first edge 91 of the bracket 90.

Figure 10:
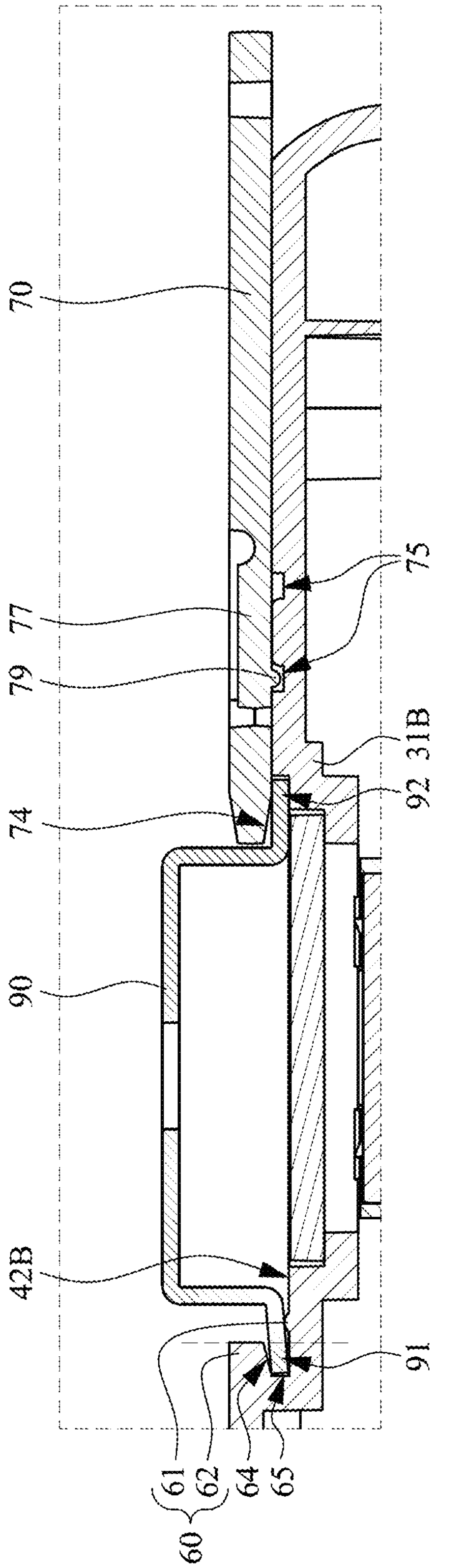
FIG. 10 is a cross-sectional view of the energy meter assembly and the bracket in FIG. 9 taken at a line 10-10'.

As shown in FIG. 10, in this embodiment, the first protrusion 61 is a semi-cylindrical bump, but it is not limited thereto, and may be a bump of other shapes. The second protrusion 62 has a first inclined surface 64. The first inclined surface 64 faces the second surface 42B of the second body 31B, and is inclined away from the second surface 42B in a direction toward the bracket 90 (i.e., a direction toward a holding element 70 described below). The first inclined surface 64 is configured to interfere with the first edge 91 of the bracket 90. Specifically, when the first edge 91 of the bracket 90 is inserted into the space 65, the first edge 91 of the bracket 90 is pushed up by the first protrusion 61 to abut against the first inclined surface 64, so that the first edge 91 of the bracket 90 is firmly stuck in the holding structure 60.

As shown in FIG. 10, in an embodiment, a projection of the second protrusion 62 on the second surface 42B does not overlap with a projection of the first protrusion 61 on the second surface 42B. In other words, the first protrusion 61 is located outside the space 65, so that the first inclined surface 64 optimally interferes with the first edge 91 of the bracket 90 and is more firmly stuck between the first protrusion 61 and the second protrusion 62.

As shown in FIG. 9, in an embodiment, the second housing 30B further includes the holding element 70. The holding element 70 is slidably disposed on the second surface 42B of the second body 31B and corresponds to the holding structure 60. The holding element 70 is configured to hold a second edge 92 of the bracket 90. The second edge 92 and the first edge 91 are two opposite sides of the bracket 90. The holding structure 60 and the holding element 70 are configured to clamp the bracket 90.

Please refer to FIG. 9 and FIG. 10, after the first edge 91 of the bracket 90 is held by the holding structure 60, the holding element 70 is slid toward the bracket 90 to hold the second edge 92 of the bracket 90, so that the second energy meter 22 is installed on the bracket 90. In an embodiment, a front end of the holding element 70 has a second inclined surface 74. The second inclined surface 74 faces the second surface 42B of the second body 31B, and is inclined away from the second surface 42B in a direction toward the bracket 90 (i.e., a direction toward the holding structure 60). The second inclined surface 74 is configured to interfere with the second edge 92 of the bracket 90, so that the holding element 70 can more firmly hold the second edge 92 of the bracket 90.

Figure 11:
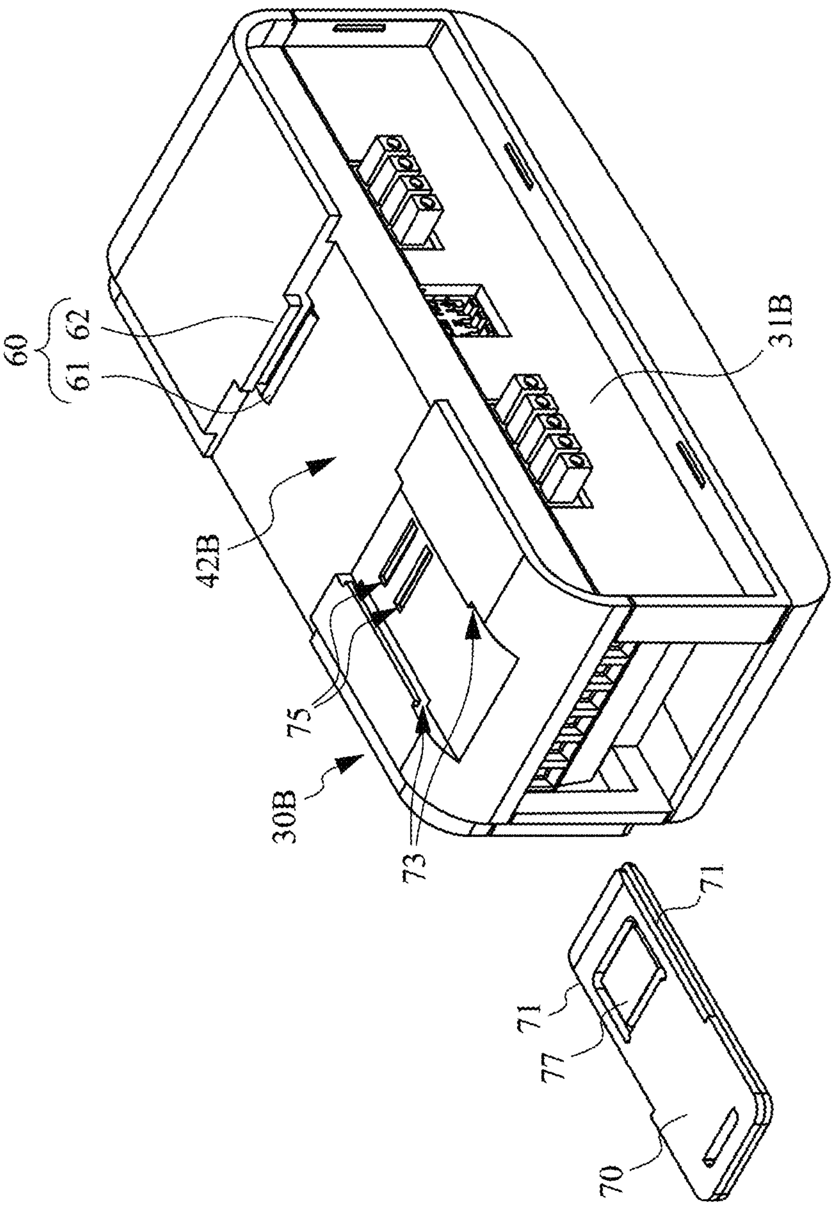
FIG. 11 is a schematic diagram showing the second energy meter in FIG. 9 after removing a holding element.

Please refer to FIG. 11, the second housing 30B may include one or more guide rails 71 and one or more guide grooves 73. Each of the guide rails 71 corresponds to one guide groove 73. In this embodiment, two guide rails 71 are respectively provided on two opposite sides of the holding element 70, and two corresponding guide grooves 73 are provided on the second surface 42B of the second body 31B. In other embodiments, two guide grooves 73 may be respectively provided on two opposite sides of the holding element 70, and two corresponding guide rails 71 may be provided on the second surface 42B of the second body 31B. The guide rails 71 are slidably disposed in the guide grooves 73, so that the holding element 70 is slidably disposed on the second surface 42B of the second body 31B.

Figure 12:
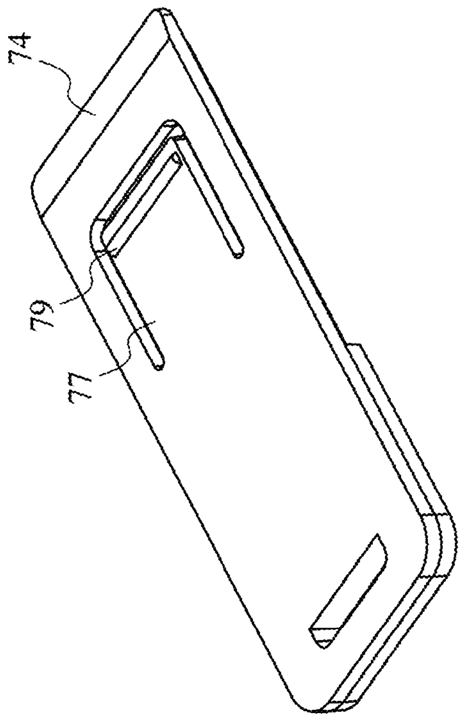
FIG. 12 is a schematic diagram of the holding element in FIG. 11 viewed from another angle.

Please refer to FIG. 11, the second surface 42B of the second body 31B may be further provided with one or more first engaging elements 75. Please refer to FIG. 12, the holding element 70 has an elastic arm 77, and the elastic arm 77 may be provided with a second engaging element 79. The second engaging element 79 is configured to engage with any first engaging element 75 to fix a position of the holding element 70 on the second surface 42B. In this embodiment, the first engaging element 75 is an engaging slot, and the second engaging element 79 is an engaging block mating the engaging slot. In other embodiments, the first engaging element 75 may be an engaging block, and the second engaging element 79 may be an engaging slot mating the engaging block. In this embodiment, the engaging block has a semi-cylindrical structure, but is not limited to this and may have other shapes.

Please refer to FIG. 10 and FIG. 11, in this embodiment, the second surface 42B may be provided with two first engaging elements 75. The second engaging element 79 can engage with either one of the first engaging elements 75, so that the holding element 70 can be held at different positions on the second surface 42B. Please refer to FIG. 10, when the second engaging element 79 is engaged with the first engaging element 75 close to the bracket 90, the holding element 70 is held at a first position and holds the second edge 92 of the bracket 90. When the second engaging element 79 is engaged with the first engaging element 75 away from the bracket 90, the holding element 70 is held at a second position and is separated from the second edge 92 of the bracket 90, so as to facilitate separating the bracket 90 from the second energy meter 22.

Please refer to FIG. 2 and FIG. 4, in the first energy meter 21, a first surface 41A of the first body 31A is also provided with one or more vertical walls 32, and the first cover 35A also has one or more side walls 34. The first housing 30A of the first energy meter 21 also includes one or more sliders 57 and one or more chute structures 50. The chute structure 50 is disposed on one of the vertical wall 32 and the side wall 34, and the slider 57 is disposed on the other one of the vertical wall 32 and the side wall 34. The first body 31A further has a fifth surface 45A and a sixth surface 46A opposite to the fifth surface 45A. Please refer to FIG. 1, FIG. 2, and FIG. 5 to FIG. 8, the slider 57 can slide to different positions, so that the first cover 35A exposes the terminal block 23 at the fifth surface 45A, exposes the third connector 24 at the sixth surface 46A, or covers the terminal block 23 and the third connector 24. Other details of the sliders 57 and the chute structures 50 of the first energy meter 21 are as described above for the second energy meter 22 and will not be described again here.

Please refer to FIG. 9 to FIG. 12, in the first energy meter 21, a second surface 42A of the first body 31A of is also provided with the holding structure 60, the holding element 70, the one or more guide rails 71 and the one or more guide grooves 73, the details of which are as described above for the second energy meter 22 and will not be described again here.

In sum, a housing of an energy meter of the present disclosure includes a body and a cover slidably disposed on the body. The cover can slide upward or downward relative to the body to expose a terminal block and/or a connector disposed on the body, thereby facilitating a user to connect external devices to the energy meter through wires. Furthermore, the cover is slidably disposed on the body through one or more sliders and one or more chute structures. Each of the chute structures includes a chute and a peripheral wall surrounding the chute. The peripheral wall is provided with one or more limiting elements configured to limit positions of the sliders in the chute, so that the sliders can stay at specific positions. Moreover, a back surface of the body may be provided with a holding structure and a slidable holding element to facilitate the user to mount the energy meter on a bracket. In addition, a side surface of the body may be provided with a boss or a recess. Through a combination of the boss and the recess, multiple energy meters can be combined into an energy meter assembly.

Although the present disclosure has been described with the above embodiments, the above embodiments are not intended to limit the present disclosure. Any person skilled in the art can make various changes and modifications without departing from the core and scope of the present disclosure. Therefore, the protective scope of the present disclosure shall be determined by the attached claims.

What is claimed is:

1. A housing for an energy meter, comprising:

a body having a first surface and a vertical wall substantially perpendicular to the first surface;

a cover having a side wall; and a chute structure and a slider, wherein the chute structure comprises a chute and a peripheral wall surrounding the chute, and the peripheral wall is provided with a first limiting element;

wherein the chute structure is disposed on one of the vertical wall and the side wall, the slider is disposed on the other one of the vertical wall and the side wall, the slider is slidably disposed in the chute, the first limiting element is configured to limit a position of the slider, and the cover is slidably disposed on the body through the slider and the chute structure.

2. The housing for the energy meter according to claim 1, wherein the first limiting element is close to an end of the chute, when the slider is limited between the first limiting element and the end of the chute, a front edge of the cover is in front of a front edge of the body, or a rear edge of the cover is behind a rear edge of the body.

3. The housing for the energy meter according to claim 1, wherein the peripheral wall of the chute structure is further provided with a second limiting element and a third limiting element, when the slider is limited between the second limiting element and the third limiting element, a front edge of the cover is substantially aligned with a front edge of the body, or a rear edge of the cover is substantially aligned with a rear edge of the body.

4. The housing for the energy meter according to claim 1, wherein the peripheral wall is further provided with a notch, and the notch communicates with the chute and is configured to allow the slider to pass.

5. The housing for the energy meter according to claim 4, wherein the notch has a first opening at an outer surface of the peripheral wall and a second opening at an inner surface of the peripheral wall, and a width of the first opening is greater than a width of the second opening.

6. The housing for the energy meter according to claim 1, wherein the body further comprises a second surface, the second surface is provided with a holding structure, the holding structure comprises a first protrusion and a second protrusion, the first protrusion is disposed on the second surface, the second protrusion extends from the second surface and forms a space with the second surface, the space is configured to receive a first edge of a bracket, and the first protrusion is configured to abut against the first edge such that the second protrusion interferes with the first edge.

7. The housing for the energy meter according to claim 6, wherein the second protrusion has a first inclined surface, and the first inclined surface faces the second surface and is configured to interfere with the first edge of the bracket.

8. The housing for the energy meter according to claim 6, wherein a projection of the second protrusion on the second surface does not overlap with a projection of the first protrusion on the second surface.

9. The housing for the energy meter according to claim 6, further comprising a holding element, a guide rail, and a guide groove, wherein the guide rail is disposed on one of the holding element and the second surface, the guide groove is disposed on the other one of the holding element and the second surface, the guide rail is slidably disposed in the guide groove, so that the holding element is slidably disposed on the second surface, and the holding element is configured to hold a second edge of the bracket.

10. The housing for the energy meter according to claim 9, wherein a front end of the holding element has a second inclined surface, and the second inclined surface faces the second surface and is configured to interfere with the second edge of the bracket.

11. The housing for the energy meter according to claim 9, wherein the second surface is further provided with a first engaging element, the holding element has an elastic arm, the elastic arm is provided with a second engaging element, and the second engaging element is configured to engage with the first engaging element to fix a position of the holding element on the second surface.

12. The housing for the energy meter according to claim 1, wherein the body further comprises a third surface, the third surface is provided with a boss, and an outer wall of the boss is provided with a first latching element.

13. The housing for the energy meter according to claim 12, wherein the body further comprises a fourth surface, the fourth surface is provided with a recess that matches the boss, and an inner wall of the recess is provided with a second latching element that matches the first latching element.

* * * * *